United States Patent
Davidian et al.

(10) Patent No.: US 10,329,960 B2
(45) Date of Patent: *Jun. 25, 2019

(54) METHOD AND APPARATUS FOR GENERATING ELECTRICITY USING A NUCLEAR POWER PLANT

(71) Applicant: L'Air Liquide, Societe Anonyme pour l'Etude et l'Exploitation des Procedes Georges Claude, Paris (FR)

(72) Inventors: Benoit Davidian, Saint Maur des Fosses (FR); Cyrille Paufique, Lyons (FR)

(73) Assignee: L'Air Liquide Societe Anonyme Pour L'Etude et L'Exploitation Des Procedes Georges Claude, Paris (FR)

(*) Notice: Subject to any disclaimer, the term of this patent is extended or adjusted under 35 U.S.C. 154(b) by 199 days.

This patent is subject to a terminal disclaimer.

(21) Appl. No.: 15/106,602

(22) PCT Filed: Dec. 17, 2014

(86) PCT No.: PCT/FR2014/053392
§ 371 (c)(1),
(2) Date: Jun. 20, 2016

(87) PCT Pub. No.: WO2015/092277
PCT Pub. Date: Jun. 25, 2015

(65) Prior Publication Data
US 2016/0333745 A1    Nov. 17, 2016

(30) Foreign Application Priority Data
Dec. 20, 2013    (FR) ..................... 13 63248

(51) Int. Cl.
*F01K 3/18*    (2006.01)
*F01K 7/16*    (2006.01)
(Continued)

(52) U.S. Cl.
CPC .............. *F01K 13/00* (2013.01); *F01D 13/00* (2013.01); *F01D 15/10* (2013.01); *F01K 3/18* (2013.01);
(Continued)

(58) Field of Classification Search
CPC .......... F01D 13/00; F01D 15/10; F01K 11/02; F01K 13/00; F01K 15/00; F01K 23/02;
(Continued)

(56) References Cited

U.S. PATENT DOCUMENTS 3,943,719 A    3/1976    Terry et al.
4,329,842 A    5/1982    Hoskinson
(Continued)

FOREIGN PATENT DOCUMENTS

JP    56047625 A  *  4/1981    ............. F01K 23/10
JP    S56 47625        4/1981
(Continued)

OTHER PUBLICATIONS

Dubetier, R., et al., "Cryogenic Solutions for Energy Storage and the Optimization of Energy Supply," Revue Generale du Froid, pp. 1-10. English Abstract only.
(Continued)

*Primary Examiner* — Laert Dounis
*Assistant Examiner* — Matthew T Largi
(74) *Attorney, Agent, or Firm* — Justin K. Murray

(57) ABSTRACT

A method for generating electricity by means of a nuclear power plant and a liquid vaporization apparatus involves producing heat energy by means of the nuclear power plant and using the heat energy to vaporize water or to heat water vapor, expanding the water vapor formed in a first turbine and using the first turbine to drive an electricity generator in order to produce electricity, vaporizing liquefied gas coming from a cryogenic storage in order to produce a pressurized
(Continued)

gas, reheating the pressurized gas with a part of the water vapor intended for the first turbine of the power plant and expanding the pressurized fluid in a second turbine to produce electricity.

13 Claims, 1 Drawing Sheet

(51) Int. Cl.
    *F01K 13/00*     (2006.01)
    *F01K 25/10*     (2006.01)
    *F01K 7/22*     (2006.01)
    *F01K 7/38*     (2006.01)
    *F01K 23/02*     (2006.01)
    *G21D 1/02*     (2006.01)
    *H02K 7/18*     (2006.01)
    *F01K 23/08*     (2006.01)
    *F01D 13/00*     (2006.01)
    *F01D 15/10*     (2006.01)
    *F01K 11/02*     (2006.01)
    *F01K 15/00*     (2006.01)

(52) U.S. Cl.
    CPC ............... *F01K 3/181* (2013.01); *F01K 7/16* (2013.01); *F01K 7/22* (2013.01); *F01K 7/38* (2013.01); *F01K 11/02* (2013.01); *F01K 15/00* (2013.01); *F01K 23/02* (2013.01); *F01K 23/08* (2013.01); *F01K 25/10* (2013.01); *G21D 1/02* (2013.01); *H02K 7/1823* (2013.01); *Y02E 20/16* (2013.01)

(58) Field of Classification Search
    CPC . F01K 23/08; F01K 3/18; F01K 3/181; F01K 7/16; F01K 7/22; F01K 7/38; G21D 1/02; H02K 7/1823
    See application file for complete search history.

(56) References Cited

U.S. PATENT DOCUMENTS

| | | | | |
|---|---|---|---|---|
| 5,060,480 | A * | 10/1991 | Saulnier | ................ F25J 1/0017 |
| | | | | 62/50.2 |
| 6,622,470 | B2 * | 9/2003 | Viteri | ................... F01K 21/047 |
| | | | | 60/39.52 |
| 7,028,481 | B1 | 4/2006 | Morrow | |
| 2008/0216510 | A1 * | 9/2008 | Vandor | ..................... F02C 6/16 |
| | | | | 62/600 |
| 2009/0100845 | A1 | 4/2009 | Amir et al. | |
| 2009/0282840 | A1 * | 11/2009 | Chen | .................... F01D 15/005 |
| | | | | 62/50.3 |
| 2011/0132032 | A1 * | 6/2011 | Gatti | ......................... F02C 6/10 |
| | | | | 62/615 |
| 2012/0151961 | A1 | 6/2012 | Ha et al. | |
| 2012/0216520 | A1 * | 8/2012 | Chen | ......................... F03G 7/06 |
| | | | | 60/412 |

FOREIGN PATENT DOCUMENTS

| | | |
|---|---|---|
| JP | S59 180012 | 10/1984 |
| JP | H04-112634 | 4/1992 |
| JP | 2000-120404 | 4/2000 |

OTHER PUBLICATIONS

International Search Report and Written Opinion for PCT/FR2014/053392, dated Apr. 8, 2015.

\* cited by examiner

METHOD AND APPARATUS FOR GENERATING ELECTRICITY USING A NUCLEAR POWER PLANT

CROSS REFERENCE TO RELATED APPLICATIONS

This application is a § 371 of International PCT Application PCT/FR2014/053392, filed Dec. 17, 2014, which claims the benefit of FR1363248, filed Dec. 20, 2013, both of which are herein incorporated by reference in their entireties.

FIELD OF THE INVENTION

The present invention relates to a method and apparatus for the generation of electricity using a nuclear power plant. The invention may also relate to a method for the generation of electricity which also permits the storage of energy by the liquefaction of gas. The invention also relates to apparatus for the implementation of such methods.

A first object of the invention is the generation of electricity with improved efficiency.

A second object of the invention is the reduction of storage costs for energy generated by an electricity generation method using a power plant and incorporating an electrical energy storage facility using liquefied gas.

BACKGROUND OF THE INVENTION

Many nuclear power plants are pressurized water reactors.

These nuclear power plants comprise at least two mutually independent water circuits: the primary circuit and the secondary circuit.

The function of the primary circuit is the capture of heat from the nuclear reaction. Heat is produced in very large quantities by the fission of uranium atoms.

Placed within the reactor vessel, water in the primary circuit thus achieves a temperature of approximately 320°, after having been heated during the chain reaction.

This water does not boil, as it is very highly pressurized. It is then routed from the reactor core to the primary circuit, which is a closed circuit.

The water in the primary circuit heats the water in the secondary circuit via a steam generator, which permits the exchange of heat between the two independent circuits. The pipes in the primary circuit heat the water in the secondary circuit by contact to form water vapor.

The water in the secondary circuit is at a lower pressure, and is therefore converted into steam. This steam drives the reactor turbine. The rotation of the turbine in turn drives the generator, thus permitting the production of electricity.

Other nuclear power plants have a primary circuit only, and the water which is heated by the nuclear reaction is vaporized to form water vapor.

It is surprising to observe that the generation of electricity is more efficient where a proportion of the heat generated by the power plant is used, not in the steam turbine of the power plant, but for the preheating of a gas which is to be fed to a turbine.

According to the invention, primary (rather than residual) thermal energy is used, which is normally employed for the generation of electricity in the power plant, at the time, moreover, where electricity is to be supplied to the grid system. The superior efficiency of the vaporized air (or atmospheric gas) cycle, in comparison with the steam cycle of the steam turbine of the power plant, is exploited to deliver more energy to the grid system.

During periods of low electricity consumption, it is sometimes necessary to store thermal energy generated by the power plant. Thermal energy storage facilities required for this purpose are voluminous, expensive and relatively difficult to implement.

The present invention proposes the elimination or reduction in size of these storage facilities, and the replacement thereof, at least partially, by a system for the liquefaction of air or of atmospheric gas.

US-A-2012151961 describes a method for the storage of liquefied air. During phases of low electricity demand, air is liquefied and stored. During phases of high electricity demand, liquid air is vaporized in a system which optimizes the recovery of cold, to generate a pressurized fluid which drives a turbine for the production of electricity. The energy obtained (and consequently the efficiency of storage) is all the more efficient if the fluid is heated using residual heat prior to expansion.

The article "Cryogenic Solutions for Energy Storage and the Optimization of Energy Supply" in the *Revue Générale du Froid*, by Dubettier et al, describes the heating of vaporized air using residual heat, or by means of natural gas burners to increase the energy produced by the expansion of air.

The solution described in the prior art is as follows:
during phases of low demand:
  Electrical energy is used to produce liquid air
  A proportion of the available thermal energy is stored for use at times of high demand, and will be used to heat up pressurized gas prior to expansion
and during phases of high demand:
  Liquefied gas is vaporized, with the recovery of cold, to produce a pressurized gas
  The pressurized gas is heated using previously stored thermal energy
  The gas is expanded to produce electricity

SUMMARY OF THE INVENTION

Rather than storing thermal energy during phases of low demand, it is proposed that a proportion of the thermal energy produced by the power plant during phases of high demand should be tapped: this reduces electricity production by the thermal power plant, but permits a substantial increase in the electrical energy produced by the pressurized fluid, which has been heated by the thermal energy thus tapped.

Although the energy efficiency performance is slightly impaired in this case, investment in a very large-scale and highly expensive thermal energy storage facility can be obviated.

One object of the invention is the reduction of the cost of an electricity generating apparatus by eliminating the requirement for storage facilities.

According to one object of the invention, a method is proposed for the generation of electricity by means of a nuclear power plant, and a liquid vaporization apparatus, wherein:

a) thermal energy is produced by means of the nuclear power plant, and the thermal energy is used to vaporize water or to heat water vapor, the water vapor formed is expanded in a first turbine, and the first turbine is used to drive an electricity generator for the production of electricity b) liquefied gas sourced from a cryogenic storage facility is vaporized to produce a pressurized gas c) the pressurized gas is heated, and d) the pressurized fluid is expanded in a second turbine for the production of electricity e) to heat the pressurized fluid, a proportion of the thermal energy produced in step a) is used for the heating of the pressurized fluid, by employing a proportion of the water vapor to be delivered to the first turbine of the nuclear power plant, or a proportion of the heat of the water vapor to be delivered to the first turbine of the nuclear power plant for the heating of the pressurized fluid, f) a fluid is heated by the heat generated by the nuclear reaction, a proportion of the heat energy of the heated fluid is used to preheat the fluid to be delivered to the second turbine, and a further proportion of the heat energy of the heated fluid is used to heat the water or water vapor delivered to the first turbine, where its expansion generates electricity, and g) a first proportion of the fluid heated by the nuclear reaction heats the water or water vapor to be delivered to the first turbine, and a second proportion of the fluid heated by the nuclear reaction heats the pressurized gas to be delivered to the second turbine, whereby the flow rate of the second proportion of the fluid is no more than 30% of the sum of the first and second proportions.

According to further optional aspects:
- a first proportion of the water vapor generated by the nuclear reaction expands in the first turbine, and a second proportion of the water vapor generated by the nuclear reaction is used to preheat the pressurized gas to be delivered to the second turbine, whereby the flow rate of the second proportion of the water vapor is no more than 30% of the sum of the first and second proportions.
- the first and second turbines in combination produce more electricity than would have been produced by the first turbine alone, using all the heat energy of the heated fluid or the gases respectively to heat the water or water vapor to be delivered to the first turbine.
- the electricity generated by the first and/or second turbine is transmitted to the grid system.
- the only gas which expands in the second turbine is the pressurized fluid.

According to another object of the invention, a method is proposed for the generation of electricity and the storage of energy, wherein:

i) during a first period operation is as above ii) during a second period a) thermal energy is produced by means of the nuclear power plant and the thermal energy is used to generate electricity b) electrical and/or mechanical energy generated by the power plant is used to liquefy the gas, and c) the liquefied gas is stored in a storage facility.

According to further optional aspects:
- the second period corresponds to a period of lower electricity demand and/or a period in which the electricity tariff is lower than in the first period.
- during the second period, the first turbine generates electricity, which is used to liquefy the gas.
- during the first period, the gas is not liquefied.
- during the first period, the stored liquid is not vaporized and/or the pressurized fluid is not expanded in the second turbine.

According to a further object of the invention, an integrated electricity generating apparatus is provided, comprising a nuclear power plant with a first turbine, which is a steam turbine, connected to means for the generation of electricity, an apparatus for the liquefaction of a gas and the vaporization of the liquefied gas with a second turbine, which is a turbine for the expansion of vaporized liquefied gas, connected to means for the generation of electricity, means for the transference of electrical or mechanical energy from the power plant to the liquefaction apparatus, and means for the preheating of the vaporized liquefied gas up-circuit of the expansion turbine, characterized in that it comprises means for the transmission i) of the water vapor generated and/or heated by the nuclear reaction, and originating from the nuclear power plant, or ii) of a fluid heated by the nuclear reaction, originating from the nuclear power plant, to the means for the preheating of the vaporized liquefied gas.

BRIEF DESCRIPTION OF THE DRAWINGS

These and other features, aspects, and advantages of the present invention will become better understood with regard to the following description, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION

Figure 1:
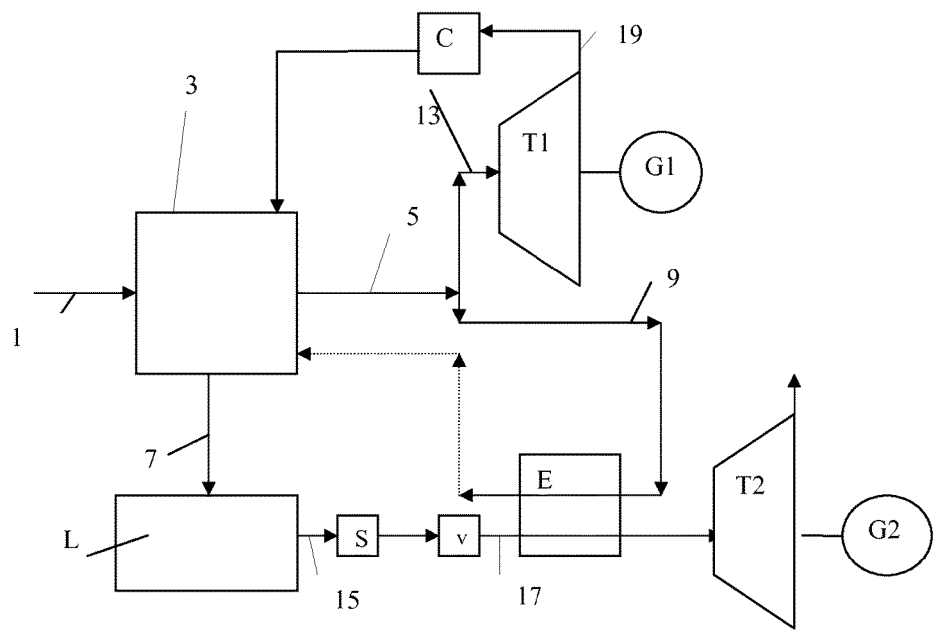
FIG. 1 represents a flow diagram in accordance with an embodiment of the present invention.
Figure 2:
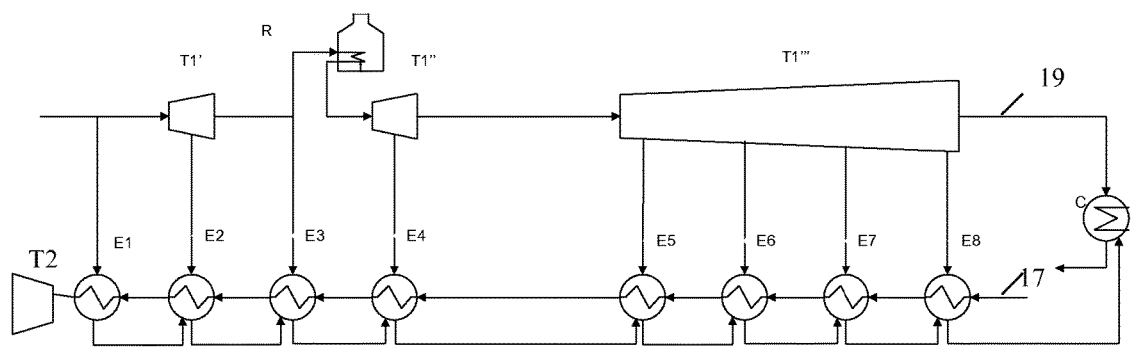
FIG. 2 represents another embodiment of the present invention.

The invention will be described in greater detail with reference to the figures, which illustrate a method according to the invention. FIG. 1 shows a schematic and partial representation of a method according to the invention, and FIG. 2 shows the details of one variant of a method according to the invention.

In FIG. 1, for the implementation of a method for the generation of electricity, a power plant 3 is used, which may be a nuclear power plant where a nuclear reaction takes place, together with a liquid vaporization apparatus V.

Thermal energy is produced by means of the power plant 3.

The power plant 3 is a nuclear power plant, in which the nuclear reaction heats and vaporizes water, whether directly or indirectly, to produce water vapor 5.

A proportion 13 of the water vapor 5, comprising at least 70% of the flow 5, is expanded in a first turbine T1, whereby the expanded steam 19 is then generally condensed in a condenser C, then returned to the power plant 3, and the first turbine is used to drive an electricity generator G1 for the production of electricity.

The remaining water vapor 9, comprising no more than 30% of the flow 5, is used to heat a vaporized cryogenic liquid 17, which may be for example air or nitrogen. The vaporized liquid 17 is heated by the water vapor in the heat-exchanger E to a temperature which exceeds the ambient temperature, and delivered to the second turbine T2. The second turbine is used to drive an electricity generator G2. If the expansion of the vaporized liquid 17 proceeds in a number of steps, the vaporized liquid 17 may be heated in advance of each step.

This represents the simplest form of embodiment of the invention. In this case, the air or nitrogen expanded in the second turbine T2 may be discharged to the atmosphere. The water vapor 9 which has heated the gas 17 in the heat-exchanger E may be returned to the power plant 3, where applicable after condensation in a condenser, which may be the same as that used down-circuit of the turbine T1 (the condenser C), or discharged to the atmosphere.

The quantity of electricity produced by the two generators G1, G2 exceeds that which would be produced if all the steam 5 were delivered to the first turbine T1, and only generator G1 were in service.

It is possible to employ the method in a more integrated manner by employing mechanical or electrical energy 7 originating from the power plant 3 for the operation of an apparatus L for the liquefaction of an atmospheric gas, for example air or nitrogen. The liquefied gas is stored in a storage facility S, and the stored liquid is tapped for vaporization in the vaporizer V, in order to supply the gas to be expanded in the second turbine T2.

The liquefied gas may be a gas other than an atmospheric gas, for example natural gas or carbon dioxide.

Preferably, during a first period, the liquefaction apparatus L is not in service, and the stored liquid is vaporized, heated by the steam 9 and delivered to the second turbine T2. This period corresponds to a period of higher electricity demand and/or a period in which the electricity tariff is higher. Only a proportion 13 of the steam is delivered to the first turbine T1. The proportion 13 constitutes at least 70% of the flow 5.

During a second period, which is a period of lower electricity demand and/or a period in which the electricity tariff is lower than in the first period, the full amount of steam 5 is delivered to the first turbine T1, constituting the flow 13, the liquefaction apparatus receives energy 7 for the liquefaction of gas and stores the liquefied gas. The vaporizer V and the turbine T2 are not in service. No proportion of the steam is delivered to the heat-exchanger E.

Rather than dividing the water vapor 5 in two for the supply of the turbine T1 and the heat-exchanger E, another possibility would be to feed the water vapor 5 into the heat-exchanger E first, prior to the expansion of the water vapor in the first turbine T1.

The water vapor 9 for the heating of the heat-exchanger E may originate from an inter-stage in the first turbine T1.

As illustrated in FIG. 2, a number of streams of water vapor at different temperatures may be used to heat the vaporized liquid 17 at different stages.

In order to improve heat exchange efficiency, the turbine T1 in FIG. 1 is comprised of a high-pressure turbine T1', an intermediate-pressure turbine T1" and a low-pressure turbine T1'". The water vapor 13 is expanded in these three turbines in series, and the steam is tapped at eight different pressure levels. Each of these streams of steam heats the vaporized liquid 17 in a heat-exchanger E1, E2, E3, E4, E5, E6, E7, E8 to produce the heated stream delivered to the turbine T2. The heat-exchangers E1, E2, E3, E4, E5, E6, E7, E8 fulfil the role of E in FIG. 1. Likewise, the turbine T2 may be comprised of a number of expansion stages, with reheating prior to each expansion, in accordance with the principle described above.

The streams of steam are combined again and delivered to the condenser C, where the steam 19 discharged from the final turbine T1'" is condensed. As illustrated in FIG. 1, the steam condensed in the condenser C may be transmitted to the power plant 3.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:

1. A method for the generation of electricity by means of a nuclear power plant, and a liquid vaporization apparatus, the method comprising the steps of:
    a) producing thermal energy by means of the nuclear power plant, and the thermal energy is used to vaporize water or to heat water vapor, the water vapor formed is expanded in a first turbine, and the first turbine is used to drive an electricity generator for the production of electricity;
    b) vaporizing a cryogenic liquid sourced from a cryogenic storage facility to produce a pressurized gas;
    c) heating the pressurized gas to form a heated pressurized fluid; and
    d) expanding the heated pressurized fluid in a second turbine for the production of electricity
    wherein in step c) to heat the pressurized gas, a proportion of the thermal energy produced in step a) is used for the heating of the pressurized gas, by employing a proportion of the water vapor to be delivered to the first turbine of the nuclear power plant, or a proportion of the heat of the water vapor to be delivered to the first turbine of the nuclear power plant for the heating of the pressurized gas, wherein the proportion of the thermal energy used for heating of the pressurized gas is no more than 30% of the thermal energy produced.

2. The method as claimed in claim 1, wherein the only gas which expands in the second turbine is the heated pressurized fluid.

3. A method for the generation of electricity and the storage of energy, wherein:
    i) during a first period, the method comprises the steps as claimed in claim 1, ii) during a second period:
  a) producing thermal energy by means of the nuclear power plant and using the thermal energy to generate electricity;
  b) using electrical and/or mechanical energy generated by the power plant to produce the cryogenic liquid, and
  c) storing the cryogenic liquid in the cryogenic storage facility.

4. The method as claimed in claim 3, wherein the second period corresponds to a period of lower electricity demand and/or a period in which the electricity price is lower than in the first period.

5. The method as claimed in claim 3, wherein, during the second period, the first turbine generates electricity, which is used to produce the cryogenic liquid.

6. The method as claimed in claim 3, wherein, during the first period, no cryogenic liquid is produced or added to the cryogenic storage facility.

7. The method as claimed in claim 3, wherein, during the second period, the cryogenic liquid sourced from the cryogenic storage facility is not vaporized.

8. The method as claimed in claim 3, wherein, during the second period, the heated pressurized fluid is not expanded in the second turbine.

9. The method as claimed in claim 3, wherein the cryogenic liquid is selected from the group consisting of liquefied air, liquefied atmospheric gases, and combinations thereof.

10. An integrated electricity generating apparatus, comprising:
  a nuclear power plant having a steam turbine that is configured to drive a first electrical generator;
  a liquefaction unit in electrical communication with the first electrical generator, such that the liquefaction unit can receive electricity from the first electrical generator;
  a cryogenic liquid storage facility in fluid communication with the liquefaction unit;
  a vaporization unit in fluid communication with the cryogenic liquid storage facility;
  a heat exchanger configured to heat a cryogenic liquid sourced from the cryogenic liquid storage facility against hot gases sourced from the nuclear power plant; and
  a second turbine configured to receive a vaporized fluid from a means for preheating the cryogenic liquid, wherein the second turbine is configured to drive a second electrical generator,
  wherein the cryogenic liquid is selected from the group consisting of liquefied air, liquefied atmospheric gases, and combinations thereof.

11. A method for the generation of electricity and the storage of energy, the method comprising a first period and a second period,
  A) wherein the first period comprises the steps of:
    producing thermal energy using a nuclear power plant;
    vaporizing a cryogenic liquid sourced from a cryogenic liquid storage facility to form a pressurized gas;
    using a first proportion of the thermal energy from the nuclear power plant to create steam that is then expanded in a first turbine, wherein the first turbine is used to drive an electricity generator for the production of electricity;
    using a second proportion of the thermal energy from the nuclear power plant to heat the pressurized gas; and
    expanding the pressurized gas in a second turbine for the production of electricity,
  B) wherein the second period comprises the steps of:
    producing thermal energy by means of the nuclear power plant, and using the thermal energy to generate electricity;
    using electrical and/or mechanical energy generated by the nuclear power plant to produce the cryogenic liquid; and
    storing the cryogenic liquid in the cryogenic storage facility,
    wherein the cryogenic liquid is selected from the group consisting of liquefied air, liquefied atmospheric gases, and combinations thereof.

12. The method as claimed in claim 11, wherein the second proportion of the thermal energy constitutes no more than 30% of the thermal energy produced by the nuclear power plant.

13. The method as claimed in claim 11, wherein the step of using electrical and/or mechanical energy generated by the nuclear power plant to produce the cryogenic liquid further comprises the step of sending electricity to an air liquefaction facility configured to liquefy atmospheric air.

* * * * *